UNITED STATES PATENT OFFICE.

JOHN BEST, OF PITTSBURG, PENNSYLVANIA.

IMPROVEMENT IN THE MANUFACTURE OF GLASS.

Specification forming part of Letters Patent No. 45,809, dated January 10, 1865.

*To all whom it may concern:*

Be it known that I, JOHN BEST, of the city of Pittsburg, in the county of Allegheny and State of Pennsylvania, have invented a new and useful Improvement in the Manufacture of Glass; and I do hereby declare the following to be a full, clear, and exact description thereof.

My invention consists in the discovery and use of a new ingredient in the manufacture of crystal glass.

There are two descriptions of crystal glass employed for the manufacture of tumblers, decanters, dishes, and other articles of glassware for table use and ornamental purposes. One, usually called "flint glass," is made by fusing a batch composed of fine sand, purified potash, oxide of lead, and niter. These ingredients make the finest quality of glassware, which owes its brilliancy, transparency, and brightness to the presence of lead. The other kind of crystal glass is cheaper and inferior in weight, transparency, and brilliancy, and is made of sand, soda-ash, nitrate of soda, and slaked lime. The latter description of glass, usually called "lime glass," is usually of a dark color, and is deficient in brilliancy, and is therefore easily distinguished from flint glass. It is also very difficult to produce uniformity of color in the different meltings, which is perhaps owing to the presence of foreign substances and impurities in the lime.

The "batch" or "mix" which I employ in the manufacture of glass differs chiefly from that employed in the making of lime glass in the absence of slaked lime and the substitution for it of a species of coarsely-granulated marble found near Texas, in the State of Maryland, and at Mapleton, in Huntington county, in the State of Pennsylvania, and probable in other localities in the United States, and which I use in the batch or mix without its being burned or otherwise treated than by being pulverized.

To enable others skilled in the art to make use of my invention or discovery, I will proceed to explain the ingredients which I employ in the preparation of the batch from which the glass is made, and the proportions of those ingredients which I have found to produce a very excellent quality of crystal glass.

The batch which I use is composed of the following ingredients in the proportions stated, viz: about ten (10) pounds of pulverized granular marble, about one hundred (100) pounds of clean sand, about fifty (50) pounds of soda-ash, (refined,) about seventeen (17) pounds of nitrate of soda. These articles are well mixed together, and are then placed in the melting-pots, and, when fused, become crystal glass. As before stated, the granular marble is not to be burned or exposed to the action of fire before being mixed with the batch.

The crystal glass thus made is of a very excellent quality, possessing much greater brilliancy than the so-called "lime glass." It is also heavier and much lighter colored, and is only slightly inferior to the flint glass, while the cost of its manufacture is very much less.

Another great advantage in the manufacture of this glass is that by observing uniformity in the quantity of this granular marble, and in the quantity and quality of the other ingredients composing the batch, the greatest regularity is secured in the quality and color of the glass produced.

I wish to be understood that I do not confine myself to the combination of the specific articles named—viz., soda-ash and nitrate of soda with the sand or silex, and the article which I call "granular marble"—in the manufacture of crystal glass, as probably some equivalents of the soda-ash and nitrate of soda might be used with a like result; nor to the exact proportions of the various ingredients specified, as the quantities may be somewhat varied, and such variations are frequently rendered advisable, according to the color and quality of the glass to be made and other circumstances; but What I do claim as my invention or discovery, and desire to secure by Letters Patent, is—

The use of the ingredients hereinbefore described, which I call "granular marble," as a substitute for slaked lime or oxide of lead, in combination with the other ingredients composing the batch or mix, as hereinbefore specified, or some of them or their equivalents, in the manufacture of crystal glass, substantially as hereinbefore described.

In testimony whereof I, the said JOHN BEST, have hereunto set my hand.

JOHN BEST.

Witnesses:
   THOS. OWSTON,
   W. BAKEWELL.